(12) United States Patent
Segal

(10) Patent No.: US 6,272,471 B1
(45) Date of Patent: Aug. 7, 2001

(54) METHOD AND APPARATUS FOR DETERRING FRIVOLOUS PROFESSIONAL LIABILITY CLAIMS

(76) Inventor: Jeffrey J. Segal, 608 Putnam St., Terre Haute, IN (US) 47802

( * ) Notice: Subject to any disclaimer, the term of this patent is extended or adjusted under 35 U.S.C. 154(b) by 0 days.

(21) Appl. No.: 09/365,437

(22) Filed: Aug. 2, 1999

(51) Int. Cl.[7] ................................................ G06F 17/60
(52) U.S. Cl. .................................................................... 705/4
(58) Field of Search ................................ 705/4; 283/54

(56) References Cited

U.S. PATENT DOCUMENTS

| | | | |
|---|---|---|---|
| 5,325,291 | 6/1994 | Garrett et al. | 705/1 |
| 5,752,237 | 5/1998 | Cherny | 705/4 |
| 5,852,808 | * 12/1998 | Cherny | 705/4 |
| 5,875,431 | * 12/1998 | Heckman et al. | 705/7 |
| 5,895,450 | 4/1999 | Sloo | 705/1 |

FOREIGN PATENT DOCUMENTS

WO 9740460 * 10/1997 (WO) .

OTHER PUBLICATIONS

Coglianese, C., "insuring Rule 11 Sanctions," (Abstract only), Michigan Law Review, vol. 88, No. 2, pp. 344–385, Nov. 1989.*

Gross, C.E., "Fee Disputes—What This MAP Subcommittee Can Do for You," Michigan CPA, vol. 42, No. 2, p. 23, 1990.*

Robinson, W.J., "Insurance Coverage of Intellectual Property Lawsuits in the Computer Industry," (Abstract only), International Computer Law Adviser, vol. 6, No. 3–4, pp. 21–42, Dec. 1991–Jan. 1992.*

Friedman, D.D., "Making Sense of English Law Enforcement in the 18th Century," http://www.best.com/~ddfr/Academic/England_18thc./England_18thc.html, Sep. 2000.*

Friedman, D.D., "My Academic Page," http://www.best.com/~ddfr/Academic/Academic.html, Sep. 2000.*

* cited by examiner

*Primary Examiner*—V. Millin
*Assistant Examiner*—Nicholas David Rosen
(74) *Attorney, Agent, or Firm*—Fish & Neave; Jeffrey H. Ingerman

(57) ABSTRACT

A plan of countersuit insurance provided to professionals, possibly as part of or along with their professional liability insurance, deters frivolous professional malpractice claims. The plan of insurance pays legal costs of countersuits for improper prosecution when a frivolous claim has been made and, preferably, tried to a judgment for the accused professional, and an objective review concludes that the claim was frivolous. As part of the insurance plan, the names of covered professionals are posted on a publicly accessible database. If a potential plaintiff or his or her attorney finds a potential defendant's name on the database, it may be a deterrent to filing weaker claims that might be viewed as frivolous. Upon approval of an applicant for such countersuit insurance, the applicant's name is posted to a public database such as a central database on a World Wide Web site, or it is posted to an in-house database at the insurance carrier, which is accessible, along with other carriers' databases, through a central search engine on a World Wide Web site. Instead of, or in addition to, access via the Internet, access can be provided through a dial-up facility.

21 Claims, 6 Drawing Sheets

US 6,272,471 B1

METHOD AND APPARATUS FOR DETERRING FRIVOLOUS PROFESSIONAL LIABILITY CLAIMS

BACKGROUND OF THE INVENTION

This invention relates to the reduction of frivolous professional liability claims. More particularly, this invention relates to the provision of insurance to pay the legal costs of countersuits for improper prosecution of frivolous professional liability claims, including publicizing the identities of holders of such insurance as a deterrent.

As society has become more litigious, professionals (including physicians, attorneys, architects and others) have found themselves defending an increasing number of professional liability claims brought by patients or clients unhappy with the quality of the professional services rendered, or with the results of those services. In some cases, charges of professional misconduct are warranted. However, in many more cases, the charges are unwarranted; despite competent services rendered at or above the appropriate level of care, concern and attention, and without fault on the part of the professional, the desired result may not be achieved in all cases. Nevertheless, to avoid the disruption of a protracted legal action, and to control the risk of uncertain legal costs and expenses associated with unpredictable jury outcomes, such frivolous cases are frequently settled by the accused professionals (or their professional liability carriers) for their nuisance value.

A frivolous charge of professional misconduct may be brought on behalf of an unhappy patient or client simply because there is no adequate disincentive not to do so. Although it may be possible, if the frivolous nature of the complaint can be proven, to pursue a "countersuit" for improper prosecution against the proponents of frivolous claims—e.g., against the patient/client, his or her attorney, or any expert witness on behalf of the patient/client—such countersuits frequently are not instituted or pursued because of the commitment in time, and particularly in legal fees, that is involved. By "countersuit" is meant a separate legal action brought, as countersuit plaintiff, by the accused professional who was defendant in the original lawsuit, against, as countersuit defendant, the plaintiff in the original lawsuit or another proponent of the original lawsuit, including the original plaintiff's attorney or expert witness; "countersuit" could also include a counterclaim in the original lawsuit. "Improper prosecution" is meant to include any cause of action under one or more of the following legal theories: malicious prosecution, abuse of process, intentional infliction of emotional distress, defamation, prima facie tort, barratry, or any other legal theory that may be appropriate.

Although these problems affect many different professional fields as discussed above, the problem is particularly acute in the case of physicians. Therefore, the remainder of this specification will be addressed to medical malpractice claims and medical malpractice insurance, it being understood that the discussion applies equally well to other types of professional liability claims and insurance.

Even though medical malpractice claims usually are covered by insurance, they have many negative implications. First, one's competence is challenged and one's reputation is damaged, threatening one's future livelihood. Second, the stress of practicing medicine is increased. Third, the physician-patient relationship is damaged. Fourth, physicians are encouraged to practice cost-inefficient defensive medicine. Fifth, the physician is required to prepare for the lawsuit, spending time away from the office that does not generate income. Sixth, the premiums for malpractice liability insurance may increase, possibly even after a successful defense. Seventh, the physician is placed in a vulnerable and uncomfortable position as a witness. Eighth, the physician may be pitted against another physician (a) in trying to allocate blame if more than one physician was involved, or (b) where another physician appears as an expert witness on behalf of the plaintiff. Ninth, stress develops at home between the physician and his or her spouse and family. Tenth, the joy is taken out of practicing medicine. Eleventh, a judgment over the maximum coverage limits of a physician's malpractice insurance policy can bankrupt the physician.

For these reasons it would be desirable to be able to provide an improved deterrent to the filing and prosecution of frivolous professional liability claims.

SUMMARY OF THE INVENTION

It is an object of this invention to attempt to provide an improved deterrent to the filing and prosecution of frivolous professional liability claims.

In accordance with this invention, there is provided a method of deterring prosecution of frivolous professional liability claims against professionals. The method includes offering to professionals a plan of insurance for paying legal costs of prosecuting an improper prosecution claim against a proponent of a frivolous professional liability claim. Applications are received from professionals for the insurance. Professionals, from among those from whom the applications are received, are accepted for coverage under the plan of insurance. A database of professionals covered under the plan of insurance is maintained as professionals are accepted into and added to the plan of insurance. The database is linked to a publicly-accessible communications interface for viewing by any member of the public, and the existence of the database is publicized.

Apparatus and a system for performing the method are also provided.

"Legal costs" means attorney's fees, as well as other expenses or disbursements (including, but not limited to, court costs, photocopy expenses, expert witness fees, etc.) that may or may not be billed through the attorney. In the preferred embodiment, "legal costs" excludes any fines, penalties or judgments that may arise from a counter-countersuit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
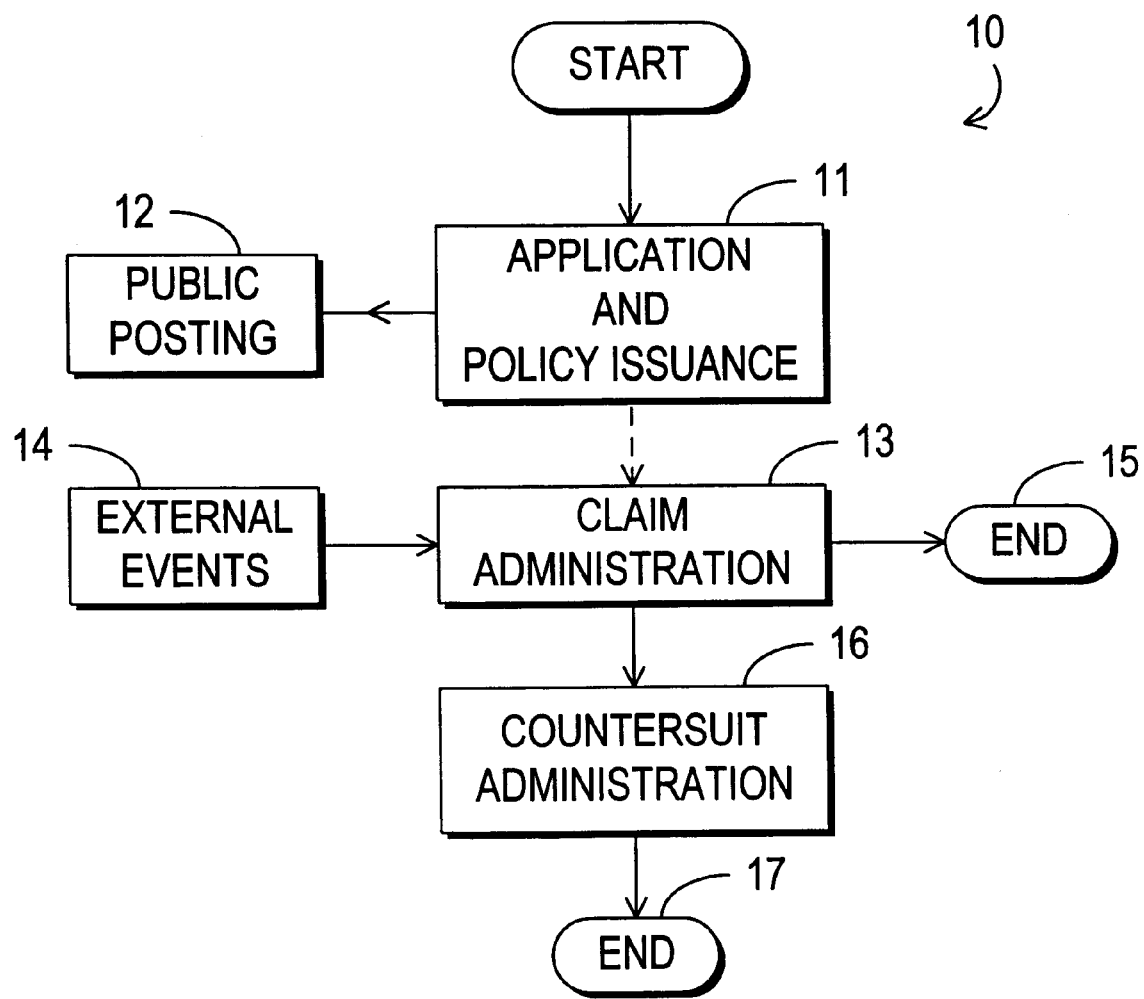
FIG. 1 is a flow diagram representing a preferred embodiment of a process according to the present invention from the initial application by a physician for coverage through the completion of a countersuit brought on behalf of that physician.

According to the present invention, the incidence of medical malpractice claims is reduced because a credible threat of a countersuit for prosecution of a frivolous claim exists. That threat is created and backed up by the availability of "countersuit insurance" which, under appropriate conditions as discussed below, will pay the legal costs of a countersuit against any proponent of a frivolous claim. Potential defendants in such a countersuit could include the original plaintiff (i.e., in a medical malpractice context, the patient who had claimed injury), the original plaintiff's attorney and any expert witness who testified on behalf of the original plaintiff. The countersuit insurance of the invention could be offered as a separate insurance policy, but more preferably could be offered as a rider to a standard medical malpractice insurance policy.

Once a physician applicant has been accepted for coverage under a policy or rider of countersuit insurance according to the present invention, the physician's name and other data would be entered into the insurance carrier's computer system. In addition to all the standard processing that would normally be carried out in connection with the issuance and support of a policy of insurance, the system would copy the insured physician's name to a database of covered physicians to be publicized. It is believed that the publicizing of names of physicians covered by countersuit insurance will deter the filing of frivolous medical malpractice claims because those who might bring such claims would have to consider the possibility that the physician might prevail in defending against the claim and would then institute a countersuit for improper prosecution.

The database of names of covered physicians preferably will be available to the public via a public data network such as the Internet, including, but not limited to, the World Wide Web. However, the database could also be available on a private network, or on a dial-up "BBS" ("bulletin board system"). Preferably, all providers of countersuit insurance would make their databases of covered physicians available at a common site, but individual providers or groups of providers may maintain separate sites. As explained below, the site or sites could include the actual database, or could be a search engine linked to the database of each provider participating in the particular site.

It is preferred that public access to the database be without cost to the querying member of the public, so as not to discourage potential plaintiffs or their attorneys from querying the database. In the case of a dial-up or BBS embodiment, a toll-free telephone number can be provided.

In the most particularly preferred embodiment of the invention, each insurance carrier or broker would maintain its own database of covered physicians linked to, and accessible by, a common search engine on a single World Wide Web site on the Internet. Alternatively, each insurance carrier or broker would upload the names from its proprietary database to a single database accessible from a single World Wide Web site. According to any of these alternatives, those who query the database would be advised to do so again after a suitable interval—e.g., a few days later—in case a covered physician's name is in the process of being added to the database or, particularly in the case where the public site is a common search engine that searches the databases of several insurance carriers or brokers to which it is linked, because the connection to one or more of the linked databases may be temporarily inoperative.

Whatever public access vehicle is chosen, its existence preferably would be publicized by advertisements, e.g., in the general press and in publications aimed at attorneys who handle plaintiff's medical malpractice litigation. The advertising would encourage potential plaintiffs or their representatives to check the database for the name of any potential defendant physician prior to initiating legal action. It then would be foolish for anyone to initiate a frivolous medical malpractice action without checking the database.

Countersuit insurance according to the invention can be offered either as a separate policy or as a rider to a medical malpractice liability insurance policy. Either way, in a preferred embodiment, if a countersuit is brought under the policy, and damages are awarded against the proponent of a frivolous malpractice claim, then the countersuit insurance carrier preferably will collect a portion—e.g., between 30% and 60%—of the damages as compensation for funding the suit, and to cover administrative costs of administering the program and funding countersuits for all policyholders. Therefore, in a preferred embodiment, any premium charged to policyholders will be minimal. Indeed, if countersuit insurance according to the invention is offered as a rider to a malpractice insurance policy, there may not need to be any additional charge beyond the premium charged for the underlying malpractice insurance policy. This is because the damages recovered in successful countersuits, plus the reduction in nuisance settlement payments on underlying malpractice claims, preferably would offset the costs of offering and administering the countersuit insurance program and the costs of prosecuting countersuits. Of course, in an alternative embodiment, the carrier may allow the physician to retain all of the countersuit recovery. Although this may necessitate the charging of a premium for countersuit coverage, it may not if the countersuit deterrent effect results in substantial savings to the carrier on malpractice claims.

In addition, in a preferred embodiment, the requirements for eligibility for countersuit insurance benefits with respect to a particular claim would be that the underlying malpractice lawsuit proceeded to a favorable judgment for the covered professional without being settled and without otherwise being terminated short of judgment, and that an objective review of the underlying malpractice claim concludes that the underlying claim was frivolous. Almost any physician who desired the countersuit coverage would likely be eligible. At one extreme is the "good" physician whose competence is beyond question and who is rarely sued. Such a physician is a good risk for countersuit insurance because the physician will rarely, if ever, make a claim for countersuit benefits. At the opposite extreme is the "bad" physician who is sued frequently and frequently settles or loses. This physician also is a good risk for countersuit insurance. Such a "bad" physician who loses on or settles the underlying claim would not be eligible for benefits under the preferred requirements set forth above. But for the cases where the "bad" physician does not settle and prevails on the underlying claim, there is no reason why that physician should not be eligible for benefits if the malpractice claim was frivolous.

The worst risk from the point of view of the insurance carrier (although likely a risk of low frequency of occurrence) could be the physician who is sued frequently but always prevails. Preferably, the insurance carrier's share of the recovery in a successful countersuit would be available to fund other countersuits on behalf of other covered physicians, spreading the cost of countersuits over all covered physicians. In the case of a physician who is sued frequently, always wins, and then always countersues, any countersuit recoveries would go toward funding subsequent countersuits on behalf of the same physician, possibly without leaving enough to fund countersuits on behalf of other covered physicians. Still, it is also possible that each countersuit recovery would have a sizable punitive component that would be well in excess of the cost of the countersuit.

As discussed above, in the preferred embodiment countersuit benefits are not available in connection with any malpractice claim that is settled, or, of course, lost by the covered physician. Moreover, even if a case is won by the physician, it is still possible that the claim was not frivolous. Therefore, as discussed above, as part of the plan of insurance, an objective review of the underlying claim, to determine whether or not it could be proved to have been frivolous, preferably is conducted when a claim for countersuit benefits is made.

In a preferred embodiment, the objective review is conducted by an attorney retained by the countersuit insurance carrier. The attorney could be an in-house attorney, but more preferably, to maintain objectivity, is an outside attorney retained by the carrier solely for this purpose. Alternatively, it may be possible to develop a set of criteria that could allow an objective determination of frivolousness to be made, at least in the first instance, by a computer, based, e.g., on responses by the physician to a questionnaire developed for this purpose. If a computer is used to make the initial determination of frivolousness, then preferably there is opportunity for human review of that decision. In one embodiment, human review would come only if the determination was made that there was no frivolousness, in which case the covered physician could ask for a review. In another embodiment, the computer determination would include a quantitative ranking, and whenever that ranking was not overwhelmingly toward the determination that was made—either for or against frivolousness—a review would be conducted. As a failsafe, any determination of frivolousness would receive a de facto review by the attorney to whom the countersuit was assigned, as part of his or her preparations for bringing the countersuit.

The invention will now be described with reference to FIGS. 1–5.

FIG. 1 shows an overview of a preferred embodiment of the process 10 for administering the plan of countersuit insurance according to the present invention. Process 10 starts with module 11, which is explained in more detail below. Briefly, in module 11 a physician's application for coverage under a policy of countersuit insurance is made, accepted and processed and the countersuit insurance policy is issued if the application is approved. As part of issuance of the policy, the covered physician's name is posted on a publicly accessible database as indicated at step 12.

Next, process 10 proceeds to module 13, based on the occurrence of external events at 14. Briefly, in module 13, a physician, having been sued for malpractice as part of events 14, makes a claim for countersuit benefits, and the claims administration process is carried out to determine whether or not the physician is entitled to benefits. If not, process 10 ends at 15.

If in claim administration module 13 it is determined that the physician is eligible for countersuit benefits, then funding for the filing of a countersuit is authorized, and process 10 proceeds to countersuit administration module 16, in which the progress of the countersuit is monitored, attorneys' bills are paid and the insurance carrier's share of any damages awarded is collected. Process 10 then ends at 17.

Figure 2:
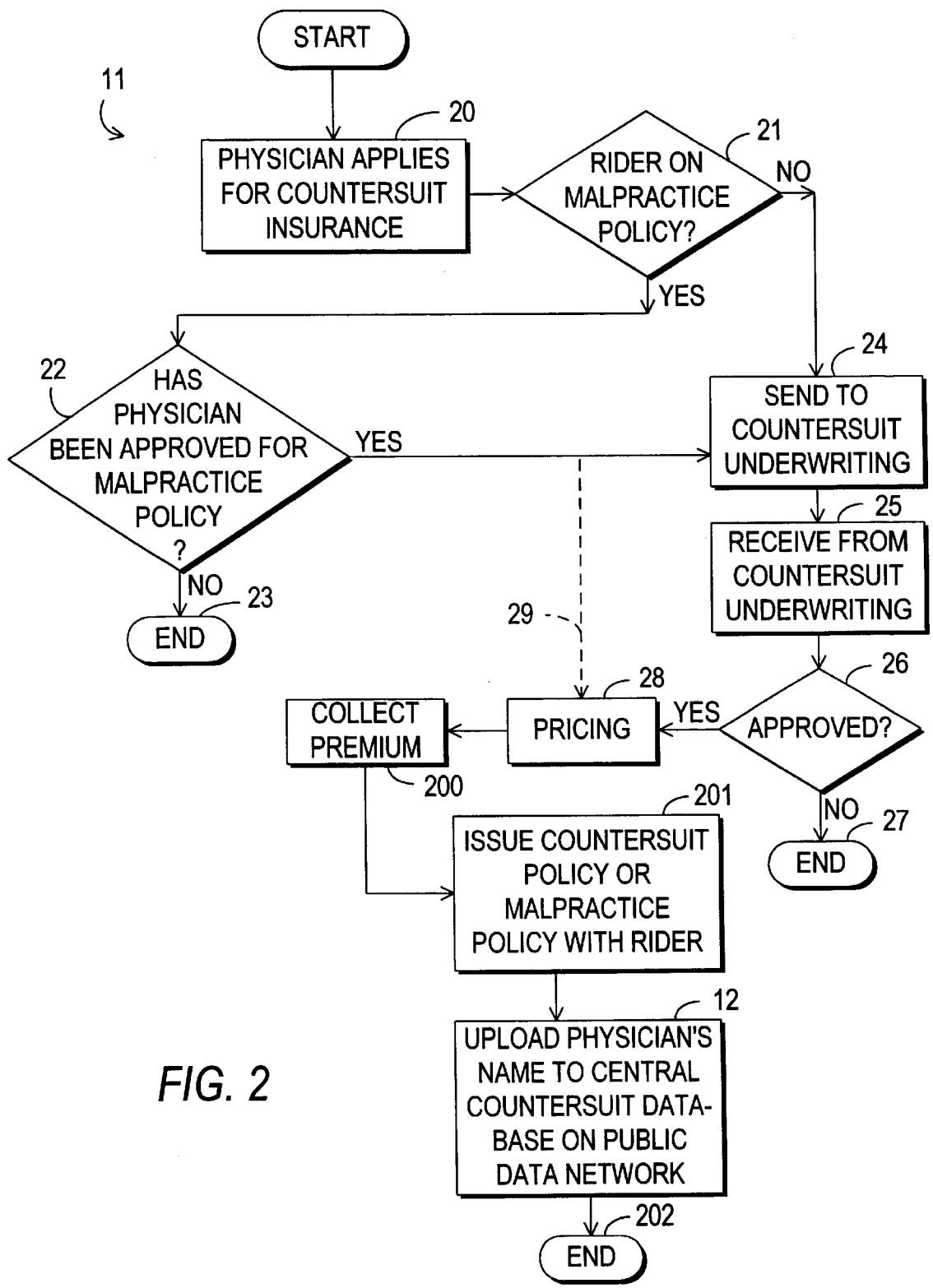
FIG. 2 is a flow diagram of the application/issuance module of the process of FIG. 1, including database posting according to the invention.

Application and issuance module 11 is shown in more detail in FIG. 2. Module 11 begins at step 20 where the physician submits an application for countersuit insurance. The application data preferably are filled in by the physician on a paper form (not shown) and then preferably entered into the insurance carrier's data processing system 510 as at keyboard 528 (see FIG. 5). Alternatively, subject to relevant government-imposed insurance regulations, an electronic application can be made available on a publicly accessible data network such as the Internet, and the application data entered by the physician can be entered into system 510 directly at 534 via modem or router 532.

As mentioned above, countersuit insurance according to the invention can be offered as a stand-alone policy of insurance or as a rider to a malpractice insurance policy. At test 21, it is determined (by reference to the application data) whether the applicant physician is applying for a stand-alone policy or a rider. (The application for a rider could be for a rider on a new malpractice insurance policy, or could be for a new rider to be added on renewal of an existing malpractice insurance policy.) If the physician has applied for a rider, then at test 22 it is determined whether or not the physician has been approved for the underlying malpractice coverage. If at test 22 the physician has not been approved for malpractice coverage (either because of the physician's risk rating or other factors, or because no application was made for an underlying malpractice insurance policy, meaning that the request for a rider was an error), then the process ends at 23 and no coverage is provided.

If at test 22 the physician has been approved for the underlying medical malpractice insurance policy, or if at test 21 the physician is not applying for a rider but for a stand-alone policy, the process proceeds to step 24 for underwriting, where it is determined whether or not the physician qualifies, from a risk management perspective, for the countersuit insurance. Although it may be possible to provide a sufficiently complex expert system, and to gather sufficient information on the application, for the underwriting to be performed automatically (e.g., by a computer), traditionally underwriting has been done manually (e.g., by actuaries). Thus at step 24 the application data would be sent to an underwriter and the process would wait for completion of the underwriting. At step 25, on completion of the underwriting, the application would be returned and the underwriter's comments and conclusions would be entered into the system (or, in the case of automated underwriting, the underwriting conclusions would be generated and stored). Note that underwriting can be carried out by the carrier's computer system or by a remote underwriting operation. Next, at test 26, the process would determine, based on the underwriter's entries (or the automated underwriting), whether or not to approve the application. If not, the process ends at 27. If at test 26, the application is approved, then the process proceeds to step 28 for pricing of the countersuit insurance.

The underwriting step could be unnecessary, particularly where the countersuit coverage is being purchased as a rider to a malpractice policy, for reasons set forth above. Specifically, it may be that every applicant is a good risk for this type of insurance, as discussed. When the coverage is being purchased as a stand-alone policy, some underwriting may be required. However, when the coverage is being purchased as a rider, it may be possible to avoid underwriting and skip directly to pricing step 28, as indicated by dashed alternate path 29.

As discussed above, countersuit insurance according to the invention could pay for itself, especially when offered as a rider to a malpractice insurance policy. Therefore, pricing step 28 may be unnecessary (i.e., apart from the pricing of the coverage as a whole) and may constitute the imposition of a "zero" premium. However, it may be that insurance carriers will charge at least a nominal administrative charge for countersuit coverage, and moreover it may be found that the coverage does not pay for itself, depending on how the invention is implemented, so that pricing step 28 would be required.

Following pricing step 28, process 10 continues with step 200 in which the premium set in step 28 is collected, and in step 201 a countersuit insurance policy, or a malpractice insurance policy with a countersuit insurance rider, is issued, or an existing malpractice insurance policy is renewed with a countersuit rider (whether or not the physician has purchased the rider before). At the time that the policy is issued or, as a practical matter, shortly thereafter (perhaps on a regular basis such as daily), the name of the covered physician preferably is uploaded to a publicly available database.

Figure 2A:
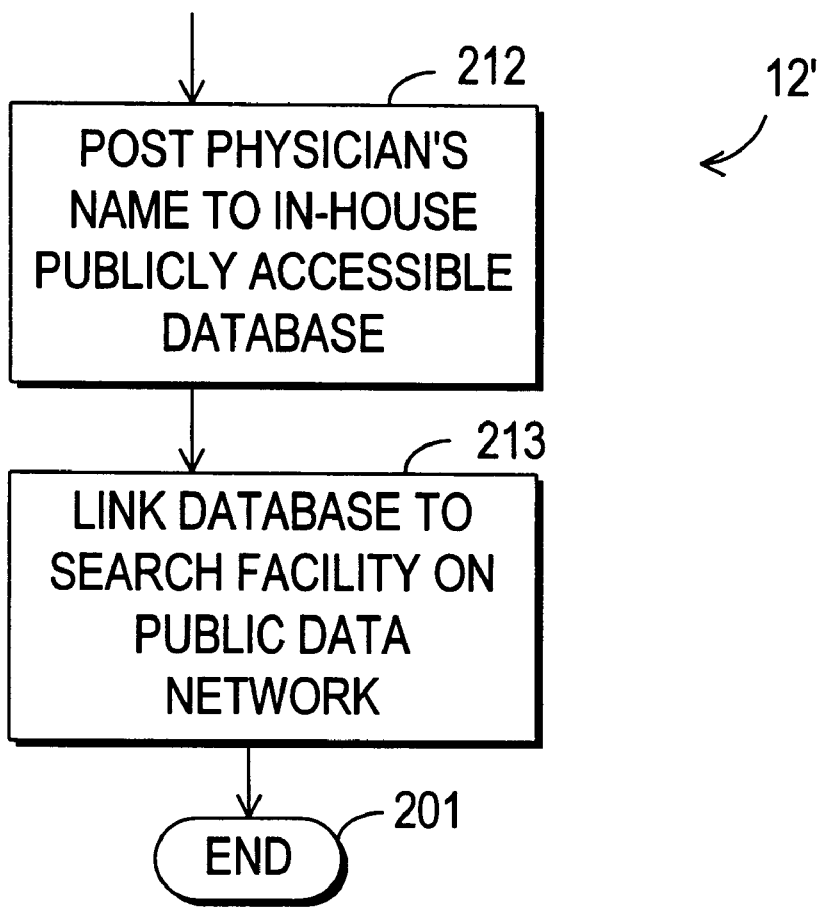
FIG. 2A is flow diagram of an alternative embodiment of the database posting shown in FIG. 2.

As shown in FIG. 2, this posting step 12 preferably involves posting the physician's name to a central database of all physicians covered by countersuit insurance issued by any insurance carrier or broker, which is available on a public data network such as the World Wide Web portion of the Internet. In an alternative shown in FIG. 2A, the posting step 12' involves the posting at step 212 of the physician's name to a publicly accessible database on an in-house computer system at the insurance carrier or broker, which is then linked at step 213 to a search facility that is available on a public data network. Again, this could be a search engine available on a World Wide Web site, such as those using the Common Gateway Interface search protocol. Preferably, if the latter embodiment is used, all insurance carriers and brokers link their databases to the same search engine.

Whatever searching mechanism is provided, preferably if a person querying any database according to the invention (whether it is one central database, one central searching site, or one of several sites to be searched), then if a particular physician's name is entered as the search criterion, the system will return not only the name entered, but also similar names. Preferably, the list of names returned will be alphabetical centered on the name entered by the searcher, with names listed before and after. If the name entered by the searcher is not found in the search, then preferably the results are centered on the closest match. This would allow the searcher to check for alternate spellings, etc., and would account for a search based on a diminutive of the physician's given name (e.g., "Bob" instead of "Robert"). Although in the most particularly preferred embodiment only alphabetically similar names would be returned, in alternative embodiments it is possible to provide more sophisticated searching that would check alternate spellings and similar-sounding names that are spelled differently. In any event, the searcher preferably would be advised to check other spellings, etc., when the results are returned.

Module 11 ends at 202 following posting step 12 or 12'.

Figure 3:
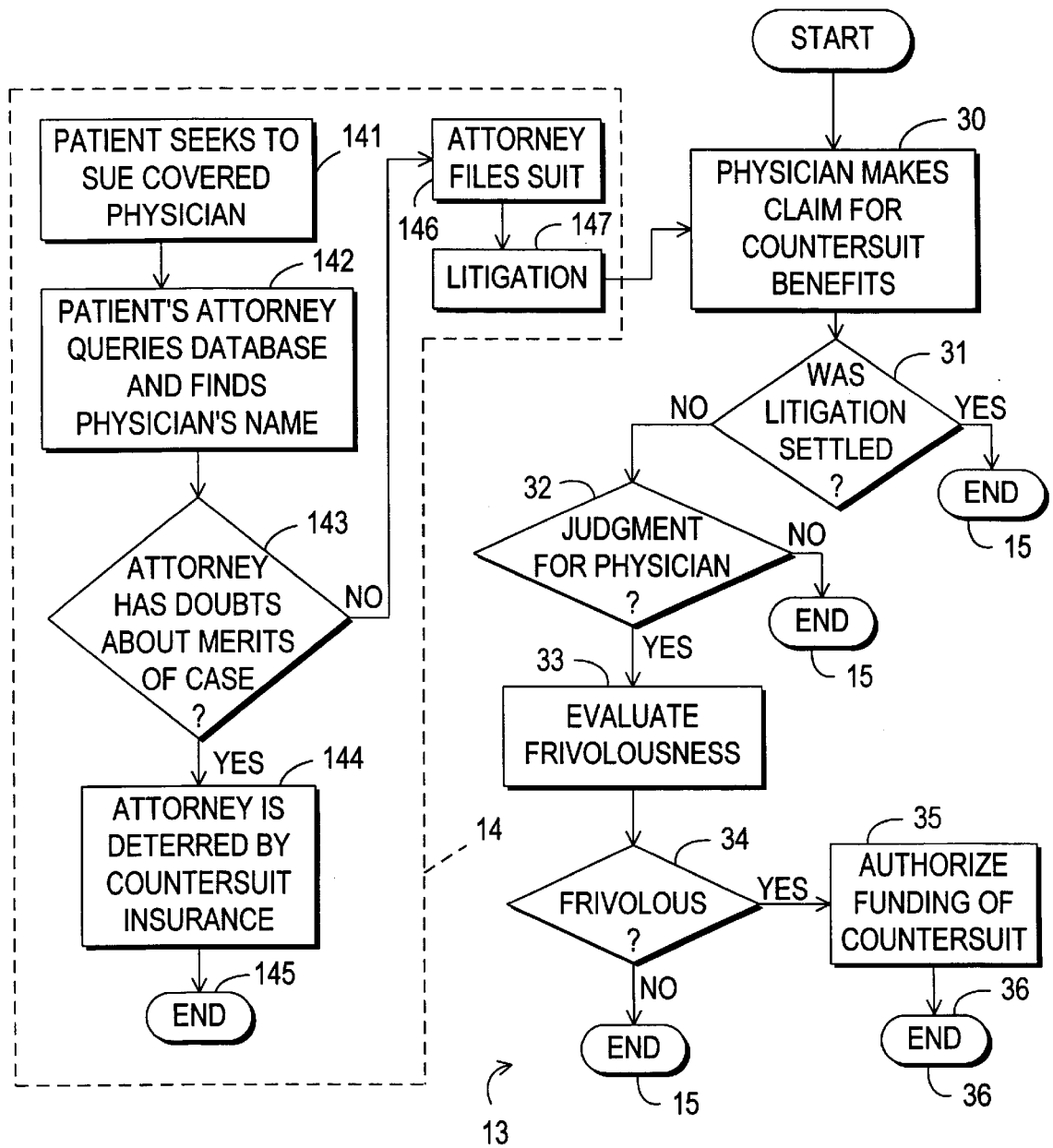
FIG. 3 is a flow diagram of the claims processing/countersuit qualification module of the process of FIG. 1.

FIG. 3 shows claim administration module 13, as influenced in an illustrative example by external events 14. At event 141, a patient seeks to sue a physician covered by countersuit insurance according to the present invention. At event 142, the patient has contacted his or her attorney, who queries the publicly accessible countersuit database or search facility (or databases or search facilities if each carrier maintains a separate database, or if different groups of carriers maintain different group databases) and finds that the physician is listed. The attorney then considers at event 143 any doubts regarding the merits of the plaintiff's case. If the attorney has sufficient doubts, he or she will be deterred at event 144 from filing suit against the covered physician, and the patient's attempt to sue the physician ends at 145. If at event 143 the attorney is not deterred, then at event 146 the attorney files suit on behalf of the patient, and at event 147, the litigation proceeds to a conclusion.

Claims administration module 13 then begins at step 30, as the physician, on conclusion of litigation 147, makes a claim for benefits under the countersuit policy or rider. At test 31, it is determined whether or not litigation 147 was settled or otherwise terminated short of final judgment. If it was, then in the preferred embodiment the physician is not eligible for benefits and claim administration module 13 ends at 15. If at test 31 it is determined that litigation 147 was not settled or otherwise terminated short of final judgment, then at test 32, it is determined whether or not judgment in litigation 147 was rendered for the physician. If at test 32 it is determined that judgment has been entered against the physician, then in the preferred embodiment claim administration module 13 ends at 15. If at test 32 it is determined that judgment has been entered for the physician and has been sustained on appeal or no appeal was taken within the time for doing so, then in the preferred embodiment at step 33 the frivolousness of the underlying malpractice claim is analyzed. Normally, this step would have to be performed based on inputs by a human being, preferably one trained in legal matters such as an attorney. The selection of such an attorney has been described above. When the person analyzing the frivolousness of the claim has completed that analysis and entered conclusions into the system, then at test 34 it is determined whether or not the claim was frivolous. If at test 34 it is determined that the claim was not frivolous, then claim administration module 13 ends at 15. If at test 34 it is determined that the claim was frivolous, then at step 35 a countersuit and funding therefor are authorized and claim administration module 13 ends at 36.

Figure 4:
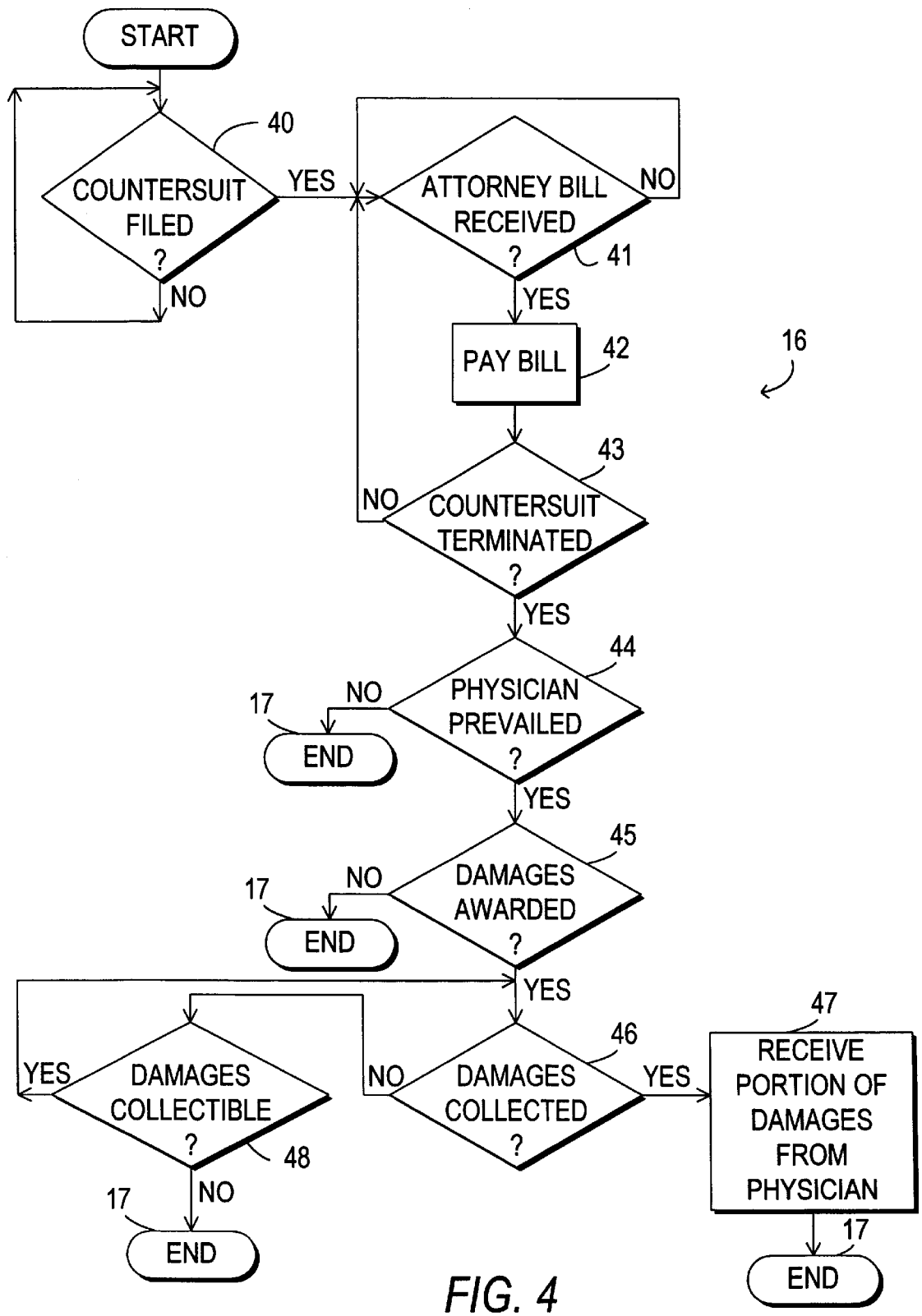
FIG. 4 is a flow diagram of the countersuit administration module of the process of FIG. 1.

FIG. 4 shows countersuit administration module 16, which starts at test 40 awaiting the filing of the countersuit authorized in step 35 of module 13. Once the countersuit has been filed, the module 16 awaits at test 41 the receipt of a bill (preferably by computer) from the attorney handling the countersuit on behalf of the physician. The bill would typically include the attorney's fees, as well as other disbursements or expenses incurred by the attorney on behalf of the countersuit plaintiff physician. Bills for such disbursements or expenses could also come directly to the insurance carrier from the provider of the product or service to the attorney, and for purposes of FIG. 4 should be treated as attorney bills. Once a bill is received, then at step 42 funds are disbursed (preferably by computer) to pay the bill, the expenditure having been authorized by the authorization 35 to file the countersuit. Step 42 preferably includes a review of the bill to determine that it is correct and reasonable, and may involve returning the bill to the attorney or provider, and receipt of a corrected bill. As soon as the bill has been paid, then at test 43 it is determined whether or not the countersuit has terminated, including termination of all appeals or the expiration of the time for filing an appeal. If it has not, then module 16 loops back to test 41 to await further bills.

Once the countersuit has terminated, then it is determined at test 44 whether or not the physician prevailed in the countersuit. If not, process 10 ends at 17. If at test 44 it is determined that the physician did prevail, then at test 45 it is determined whether or not damage's were awarded. If not, process 10 ends at 17. If at test 45 it is determined that damages were awarded, then at test 46 it is determined whether or not damages were collected. If so, then at step 47, a predetermined share of the damages (e.g., 30%, 40% or 50% according to the policy terms, which could specify any percentage, including 0%) is collected from the physician. If at test 46 it is determined that damages that were awarded have not been collected, then at test 48 it is determined whether or not the damages are collectible (e.g., the defendant might be judgment-proof). If not, process 10 ends at 17. Otherwise, process 10 loops back to test 46 to await collection of the damages.

Figure 5:
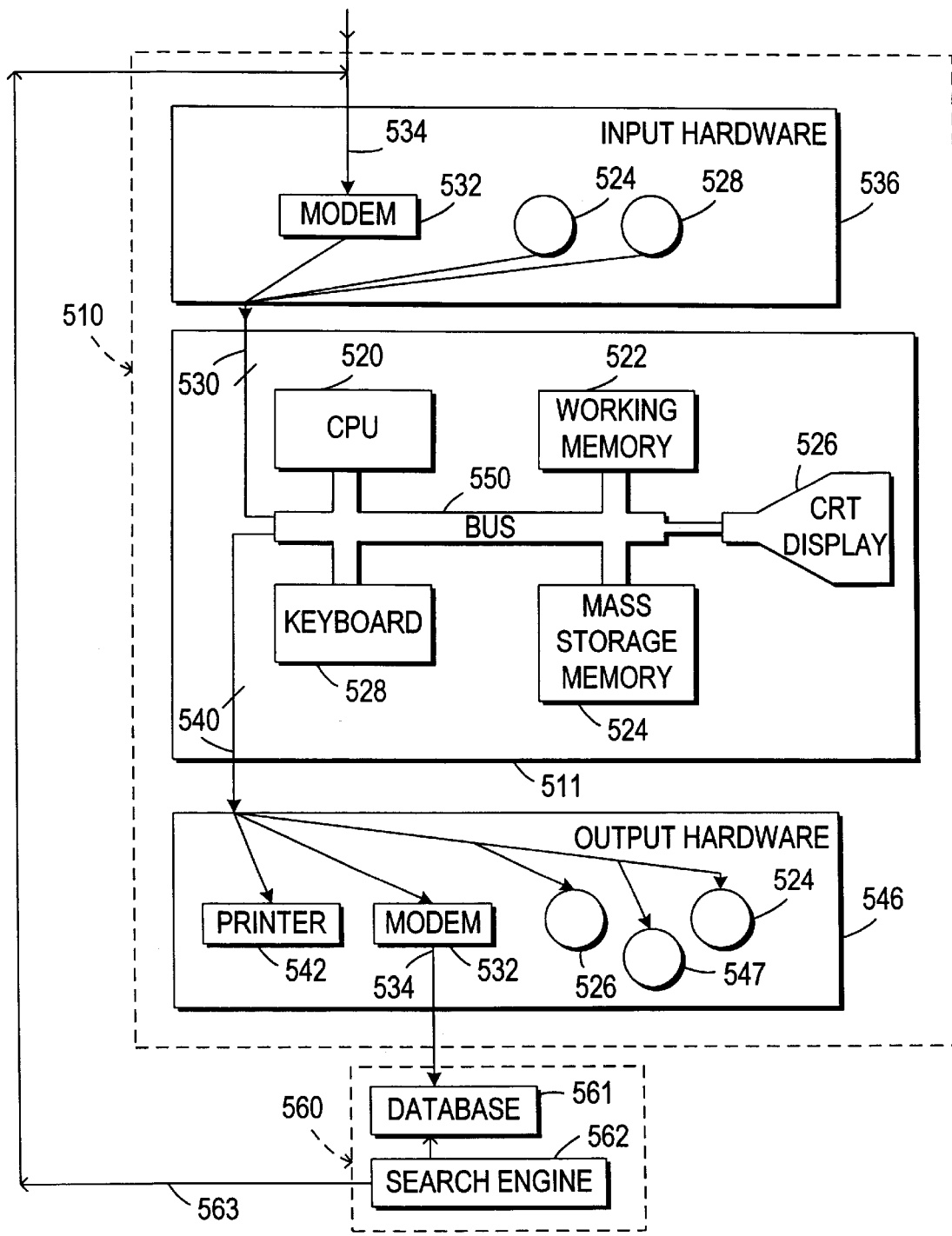
FIG. 5 is a schematic view of a preferred embodiment of a hardware system for implementing the present invention.

An exemplary computer hardware system 510 with which the present invention may be implemented is shown in FIG. 5. In FIG. 5, which shows a first preferred embodiment of apparatus according to the invention, system 510 includes a computer 511 comprising a central processing unit ("CPU") 520, a working memory 522 which may be, e.g., RAM (random-access memory) or "core" memory, mass storage memory 524 (such as one or more disk drives or CD-ROM drives), one or more cathode-ray tube ("CRT") display terminals 526, one or more keyboards 528, one or more input lines 530, and one or more output lines 540, all of which are interconnected by a conventional bidirectional system bus 550.

Input hardware 536, coupled to computer 511 by input lines 530, may be implemented in a variety of ways. Modem or modems 532, which also may be routers or other computer-to-computer communications devices, connected by a telephone line or dedicated data line (such as a T1 or T3 line) 534 can be used to allow attorneys to dial up in an embodiment in which the carrier maintains its own database (on mass storage device 524) and allows direct dial-up access. Modems/routers 532 also may be used to allow access by a central Internet search engine 562 in an embodiment where each carrier maintains its own database but access is through the central search engine. Alternatively or additionally, the input hardware 530 may comprise CD-ROM drives or disk drives 524. In conjunction with display terminal 526, keyboard 528 may also be used as an input device. For example, application data, underwriting data from the underwriter (see above), or frivolousness analysis data from the attorney (see above), may be entered through one or more keyboards 528.

Output hardware 546, coupled to computer 511 by output lines 540, may similarly be implemented by conventional devices. By way of example, output hardware 546 may include CRT display terminal 526 for displaying the premium to be charged or whether or not an application is approved or a countersuit authorized. Output hardware 546 might also include a printer or other printing device 542, so that hard copy output may be produced, or a disk drive 524, to store system output for later use. Where the names of covered physicians are to be uploaded to a central database 561 (e.g., at a site 560 on the Internet), information may be transmitted over telephone or dedicated data lines (such as T1 or T3 lines) 534, possibly with the use of modem or router 532.

Output hardware 546 preferably also includes a payment unit 547 for disbursing funds to attorneys who are prosecuting authorized countersuits, and to other providers who may bill directly as discussed above. Payment unit 547 could be a check printer if payment is made by check. Alternatively, payment unit 547 could be an electronic funds transfer unit that, using modem/router 532, communicates with the carrier's bank and the attorney's or provider's bank to transfer funds directly to the attorney's or provider's account.

Internet site 560 preferably includes a search engine 562 for querying database 561 or, where site 560 does not include database 561, search engine 562 will query the individual carrier databases via connections such as connection 563 to input data line 534. Indeed, a carrier if desired could provide access to its database both through the Internet site 560 and by a dial-up facility at input data line 534. Moreover, even if an external central database 561 is used, it need not be hosted on an Internet site, but could be accessible on a dial-up basis, or it could be accessible both through the Internet and as a dial-up facility.

In operation, CPU 520 coordinates the use of the various input and output devices 536, 546, coordinates data accesses from mass storage 524 and accesses to and from working memory 522, and determines the sequence of data processing steps.

The publication of insured physician's names allows the present invention to achieve maximum deterrence of frivolous malpractice lawsuits. Normally, insurance carriers do not publicize their policyholders' names, and many policyholders probably prefer it that way. However, it would preferably be a condition of the countersuit insurance contract that the insured allow his or her name to be publicized as a condition to receiving coverage or benefits under the countersuit insurance. Alternatively, benefits might be available to those unwilling to have their names listed but, because the deterrent effect is missing or reduced (potential plaintiffs may still be deterred somewhat by the uncertainty as to whether or not the professional is covered by countersuit insurance, although in that case it would have to be publicized that some physicians may choose not be listed for there to be any deterrent effect at all), they may be charged a higher premium.

It will be understood that although the invention has been described in connection with deterring frivolous medical malpractice claims against physicians (and other health-care professionals), countersuit insurance according to the present invention to deter frivolous professional liability claims can be provided, using the same principles, to any professional, in which case in the foregoing specification "physician" should be read as "professional" and "malpractice" or "medical malpractice" should be read as "professional liability." Moreover, the specifics of the plan of insurance described, including the qualifications for coverage and for benefits, are exemplary only, and a plan of countersuit insurance according to this invention could be implemented differently.

Thus it is seen that an effective deterrent to the filing and prosecution of frivolous professional liability claims has been provided. One skilled in the art will appreciate that the present invention can be practiced by other than the described embodiments, which are presented for purposes of illustration and not of limitation, and the present invention is limited only by the claims which follow.

What is claimed is:

1. A method of deterring prosecution of frivolous professional liability claims against professionals, said method comprising:

offering to professionals a plan of insurance for paying legal costs of prosecuting an improper prosecution claim against a proponent of a frivolous professional liability claim;

receiving applications from professionals for said insurance;

accepting professionals, from whom said applications are received, for coverage under said plan of insurance;

maintaining a database of professionals covered under said plan of insurance;

linking said database to a publicly-accessible data communications interface for viewing and searching by any member of the public; and publicizing existence of said database.

2. The method of claim 1 wherein said linking comprises linking said database to a public data network.

3. The method of claim 1 further comprising, for each professional accepted for coverage under said plan of insurance, printing a certificate evidencing said coverage.

4. The method of claim 1 further comprising:

accepting reports, from covered professionals, of professional liability claims, including data regarding said professional liability claims and disposition thereof; and for each report received of a professional liability claim from one of said covered professionals:

flagging said report for review for making a determination, based on said data regarding said claim and disposition thereof, of whether said reported professional liability claim is frivolous, and on completion of said review, when said determination is that said reported professional liability claim is frivolous, authorizing filing of a lawsuit by or on behalf of said one of said covered professionals for improper prosecution against a proponent of said frivolous professional liability claim.

5. The method of claim 4 further comprising disbursing funds to pay costs of said lawsuit.

6. Apparatus for deterring prosecution of frivolous professional liability claims against professionals, said apparatus comprising:

an offering unit for offering to professionals a plan of insurance for paying legal costs of prosecuting an improper prosecution claim against a proponent of a frivolous professional liability claim;

an application receiving unit for receiving applications from professionals for said insurance;

an application processing unit for processing said received applications and accepting professionals, from whom said applications are received, for coverage under said plan of insurance;

storage linked to said application processing unit for maintaining a database of professionals covered under said plan of insurance; and a communications unit for linking said database to a publicly-accessible data communications interface for viewing and searching by any member of the public, existence of said database being publicized.

7. The apparatus of claim 6 wherein said communications unid links said database to a public data network.

8. The apparatus of claim 6 further comprising a printer for printing a certificate evidencing said coverage for each professional accepted for coverage under said plan of insurance.

9. The apparatus of claim 6 further comprising:

a claims unit for accepting reports from covered professionals of professional liability claims, including data regarding said claims and disposition thereof;

a claims review unit comprising an output device and an input device, wherein:

for each report received of a professional liability claim from one of said covered professionals:

said output device flags said report for review for making a determination, based on said data regarding said claim and disposition thereof, of whether said reported professional liability claim is frivolous, and on completion of said review, said determination is entered into said input device; and an authorization unit for, when said determination is that said reported professional liability claim is frivolous, authorizing filing of a lawsuit by or on behalf of said one of said covered professionals for improper prosecution against a proponent of said frivolous professional liability claim.

10. The apparatus of claim 9 further comprising a disbursement unit for disbursing funds to pay costs of said lawsuit.

11. The apparatus of claim 10 wherein said disbursement unit comprises an electronic funds transfer unit.

12. The apparatus of claim 10 wherein said disbursement unit comprises a check printer.

13. The apparatus of claim 9 wherein said claims review unit further comprises a claim evaluation unit for:

receiving from said output device said flagged report, including said data regarding said claim and disposition thereof;

evaluating said data to make said determination; and transmitting said determination to said input device.

14. A system for deterring prosecution of frivolous professional liability claims against professionals, said system comprising:

means for offering to professionals a plan of insurance for paying legal costs of prosecuting an improper prosecution claim against a proponent of a frivolous professional liability claim;

means for receiving applications from professionals for said insurance;

means for processing said received applications and accepting professionals, from whom said applications are received, for coverage under said plan of insurance;

storage means linked to said application processing means for maintaining a database of professionals covered under said plan of insurance; and means for linking said database to a publicly-accessible data communications interface for viewing and searching by any member of the public, existence of said database being publicized.

15. The system of claim 14 wherein said linking means links said database to a public data network.

16. The system of claim 14 further comprising means for printing a certificate evidencing said coverage for each professional accepted for coverage under said plan of insurance.

17. The system of claim 14 further comprising:

means for accepting reports from covered professionals of professional liability claims, including data regarding said claims and disposition thereof;

means for reviewing claims comprising output means and input means, wherein:

for each report received of a professional liability claim from one of said covered professionals:

said output means flags said report for review for making a determination, based on said data regarding said claim and disposition thereof, of whether said reported professional liability claim is frivolous, and on completion of said review, said determination is entered into said input means; and means for, when said determination is that said reported professional liability claim is frivolous, authorizing filing of a lawsuit by or on behalf of said one of said covered professionals for improper prosecution against a proponent of said frivolous professional liability claim.

18. The system of claim 17 further comprising means for disbursing funds to pay costs of said lawsuit.

19. The system of claim 18 wherein said means for disbursing comprises electronic funds transfer means.

20. The system of claim 18 wherein said means for disbursing comprises a check printer.

21. The system of claim 17 wherein said means for reviewing claims further comprises means for:

receiving from said output means said flagged report, including said data regarding said claim and disposition thereof;

evaluating said data to make said determination; and transmitting said determination to said input means.

* * * * *

UNITED STATES PATENT AND TRADEMARK OFFICE
CERTIFICATE OF CORRECTION

PATENT NO. : 6,272,471 B1
DATED : August 7, 2001
INVENTOR(S) : Jeffrey J. Segal

It is certified that error appears in the above-identified patent and that said Letters Patent is hereby corrected as shown below:

Title page,
Item [56], References Cited, under Other Publications, ' 'Coglianese, C., "insuring' ' should be -- Coglianese, C., "Insuring --.

Claims,
Claim 7, column 11,
Line 56, "unid" should be -- unit --.

Signed and Sealed this

Twenty-third Day of October, 2001

Attest:

NICHOLAS P. GODICI
Attesting Officer
Acting Director of the United States Patent and Trademark Office